United States Patent
Zhang et al.

(10) Patent No.: US 7,907,756 B2
(45) Date of Patent: Mar. 15, 2011

(54) SYSTEM AND METHOD FOR VALIDATING AN IMAGE SEGMENTATION ALGORITHM

(75) Inventors: Tiantian Zhang, Waukesha, WI (US); Li Zhang, Skillman, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1131 days.

(21) Appl. No.: 11/328,353

(22) Filed: Jan. 9, 2006

(65) Prior Publication Data

US 2007/0081724 A1    Apr. 12, 2007

Related U.S. Application Data

(60) Provisional application No. 60/648,462, filed on Jan. 31, 2005.

(51) Int. Cl.
*G06K 9/00*   (2006.01)
*G06K 9/68*   (2006.01)

(52) U.S. Cl. .......................... 382/128; 382/164; 382/218

(58) Field of Classification Search .......... 382/128–134, 382/162, 164, 171, 173, 178, 187, 218–220; 358/523, 525; 345/589, 600–604
See application file for complete search history.

(56) References Cited

U.S. PATENT DOCUMENTS

| | | | |
|---|---|---|---|
| 6,215,892 B1 * | 4/2001 | Douglass et al. | 382/128 |
| 6,330,349 B1 * | 12/2001 | Hays et al. | 382/128 |
| 6,546,123 B1 * | 4/2003 | McLaren et al. | 382/128 |
| 6,681,035 B1 * | 1/2004 | Bamford et al. | 382/133 |
| 6,718,053 B1 * | 4/2004 | Ellis et al. | 382/128 |
| 6,765,585 B2 * | 7/2004 | Wada | 345/589 |
| 7,072,084 B2 * | 7/2006 | Shirasawa | 358/525 |
| 2006/0239560 A1 * | 10/2006 | Sternby | 382/187 |
| 2007/0081724 A1 * | 4/2007 | Zhang et al. | 382/173 |

OTHER PUBLICATIONS

Zhang et al., "Consistent interactive segmentation of pulmonary ground glass nodules identified in CT studies", Medical Imaging 2004: Image Processing, edited by JM Fitzpatrick, M. Sonka. Proceedings of SPIE vol. 5370, pp. 1709-1719.

* cited by examiner

*Primary Examiner* — Amir Alavi
(74) *Attorney, Agent, or Firm* — Donald B. Paschburg; F. Chau & Associates, LLC

(57) ABSTRACT

A system and method for validating an image segmentation algorithm are provided. The method for validating an image segmentation algorithm comprises: determining a region of interest in an image; segmenting the image from a first point in the region of interest by using a computer-based segmentation algorithm to obtain a first segmentation result; segmenting the image from a second point in the region of interest by using the computer-based segmentation algorithm to obtain a second segmentation result; and comparing the first segmentation result with the second segmentation result to determine a consistency of the computer-based segmentation algorithm.

22 Claims, 5 Drawing Sheets

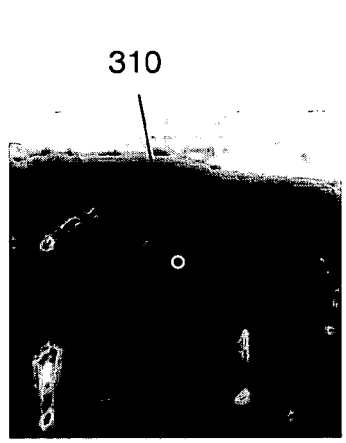 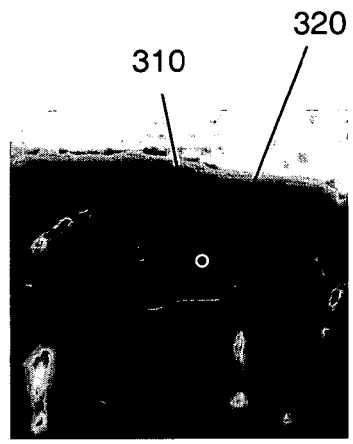 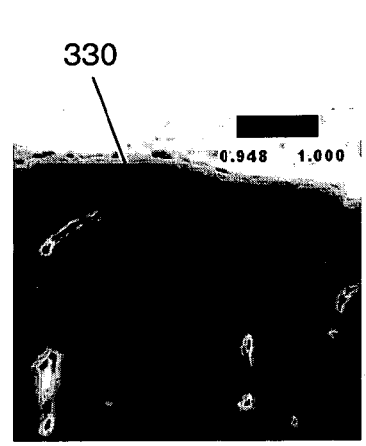
FIG. 3(a)     FIG. 3(b)     FIG. 3(c)

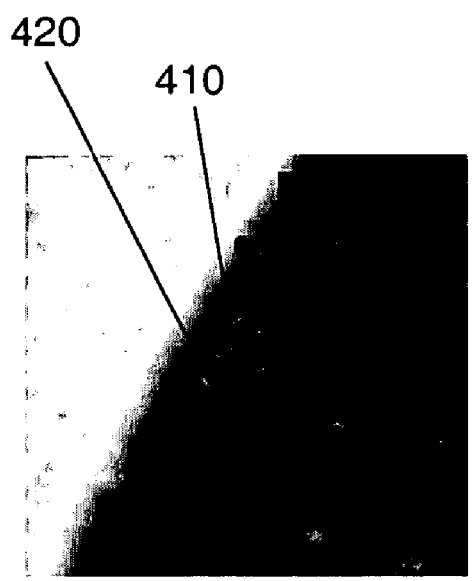 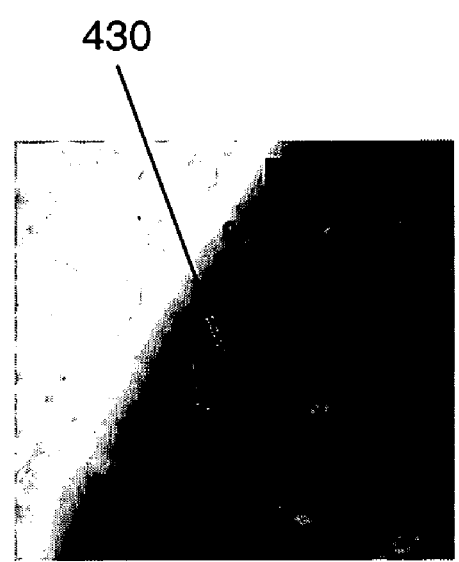
FIG. 4(a)  FIG. 4(b)

SYSTEM AND METHOD FOR VALIDATING AN IMAGE SEGMENTATION ALGORITHM

CROSS-REFERENCE TO RELATED APPLICATION

This application claims the benefit of U.S. Provisional Application No. 60/648,462, filed Jan. 31, 2005, a copy of which is herein incorporated by reference.

BACKGROUND OF THE INVENTION

1. Technical Field

The present invention relates to medical image processing, and more particularly, to a system and method for validating an image segmentation algorithm initialized by a single-click point.

2. Discussion of the Related Art

Image segmentation is the partition of an image into a set of nonoverlapping regions whose union is the entire image. The goal of image segmentation is typically to locate certain objects of interest which may be depicted in the image. This is accomplished by decomposing the image into meaningful parts which are uniform with respect to certain characteristics, such as gray level or texture.

Due to its ability to locate objects of interest, image segmentation has found increasing use in the area of medical image analysis. In particular, since computer-based medical image segmentation can provide fast, objective and consistent measurements for diagnosis and detection of certain diseases, it is in high demand by physicians and other medical practitioners alike.

Currently, there are two main types of computer-based medical image segmentation algorithms. First, there are fully-automatic segmentation algorithms which use feature extraction and prior knowledge to automatically delineate items of interest, and second there are semi-automatic segmentation algorithms which combine a physician's input with a segmentation algorithm. Since many physicians prefer an algorithm with minimal but some user interaction, semi-automatic segmentation algorithms initialized by a single-click point within a region of interest chosen by the physician are being increasingly used.

Due to the randomness of the physician's initial click points, consistency results between different initial points have become an important criterion in evaluating semi-automatic segmentation algorithms. One method for testing consistency involves initializing a semi-automatic segmentation algorithm at a limited number of randomly chosen points and comparing the segmentation results with a baseline measurement. Although this method is easy to perform, only a limited number of points are tested for consistency, thus large regions of interest containing hundreds of points may not be accurately tested. As such, a need exists for a technique of reliably testing consistency between different initial points to evaluate a segmentation algorithm initialized by a single-click point.

SUMMARY OF THE INVENTION

The present invention overcomes the foregoing and other problems encountered in the known teachings by providing a system and method for validating an image segmentation algorithm.

In one embodiment of the present invention, a method for validating an image segmentation algorithm comprises: determining a region of interest in an image; segmenting the image from a first point in the region of interest by using a computer-based segmentation algorithm to obtain a first segmentation result; segmenting the image from a second point in the region of interest by using the computer-based segmentation algorithm to obtain a second segmentation result; and comparing the first segmentation result with the second segmentation result to determine a consistency of the computer-based segmentation algorithm.

The region of interest is determined by a user input or the computer-based segmentation algorithm. The computer-based segmentation algorithm is a semi-automatic or automatic segmentation algorithm. The image is acquired by using one of a CT, MR, positron emission tomography (PET), fluoroscopic, ultrasound, x-ray or hybrid imaging technique, or scanning or digital image recording technique. The first point is determined by a user input or the computer-based segmentation algorithm. The second point determined by a user input or the computer-based segmentation algorithm.

The consistency is determined by an overlap ratio between the first segmentation result and the second segmentation result. The method further comprises outputting a result of the consistency determination. When the result of the consistency determination is output, the method further comprises converting the overlap ratio into a color representation.

In another embodiment of the present invention, a system for validating an image segmentation algorithm comprises: a memory device for storing a program; a processor in communication with the memory device, the processor operative with the program to: determine a region of interest in an image; segment the image from a first point in the region of interest by using a computer-based segmentation algorithm to obtain a first segmentation result; segment the image from a second point in the region of interest by using the computer-based segmentation algorithm to obtain a second segmentation result; and compare the first segmentation result with the second segmentation result to determine a consistency of the computer-based segmentation algorithm.

The region of interest is determined by a user input or the computer-based segmentation algorithm. The computer-based segmentation algorithm is a semi-automatic or automatic segmentation algorithm. The image is acquired by using one of a CT, MR, PET, fluoroscopic, ultrasound, x-ray or hybrid imaging device, or digital camera or flatbed scanner. The first point is determined by a user input or the computer-based segmentation algorithm. The second point determined by a user input or the computer-based segmentation algorithm.

The consistency is determined by an overlap ratio between the first segmentation result and the second segmentation result. The processor is further operative with the program code to output a result of the consistency determination. When the result of the consistency determination is output the processor is further operative with the program code to convert the overlap ratio into a color representation.

In yet another embodiment of the present invention, a method for determining the consistency between initial points in a region of interest in an image comprises: (a) segmenting the image from a first initial point in the region of interest by using a computer-based segmentation algorithm to obtain a first segmentation result; (b) segmenting the image from a new initial point in the region of interest by using the computer-based segmentation algorithm to obtain a new segmentation result; (c) determining the consistency of the computer-based segmentation algorithm by comparing the first segmentation result with the new segmentation result; and (d) repeating steps (b) and (c) until all points in the region of interest have been used as the new initial point to start the computer-based segmentation algorithm.

The region of interest is determined by a user input or the computer-based segmentation algorithm. The computer-based segmentation algorithm is a semi-automatic or automatic segmentation algorithm. The image is acquired by using one of a CT, MR, PET, fluoroscopic, ultrasound, x-ray or hybrid imaging technique, scanning or digital image recording technique. The first initial point is determined by a user input or the computer-based segmentation algorithm. The new initial point is a point in the region of interest that has not been used as an initial point to start the computer-based segmentation algorithm.

The consistency is determined by an overlap ratio between the first segmentation result and the new segmentation result. The method further comprises outputting a result of the consistency determination. When the result of the consistency determination is output, the method further comprises converting the overlap ratio into a color representation. The overlap ratio indicates the consistency between the first initial point and the new initial point.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 3 is a set of images illustrating several steps of a method for validating an image segmentation algorithm according to an exemplary embodiment of the present invention;

FIG. 4 is a pair of images illustrating correcting a bug in a computer-based segmentation algorithm using a plot of a result of a consistency determination according to an exemplary embodiment of the present invention.

DETAILED DESCRIPTION OF EXEMPLARY EMBODIMENTS

Figure 1:
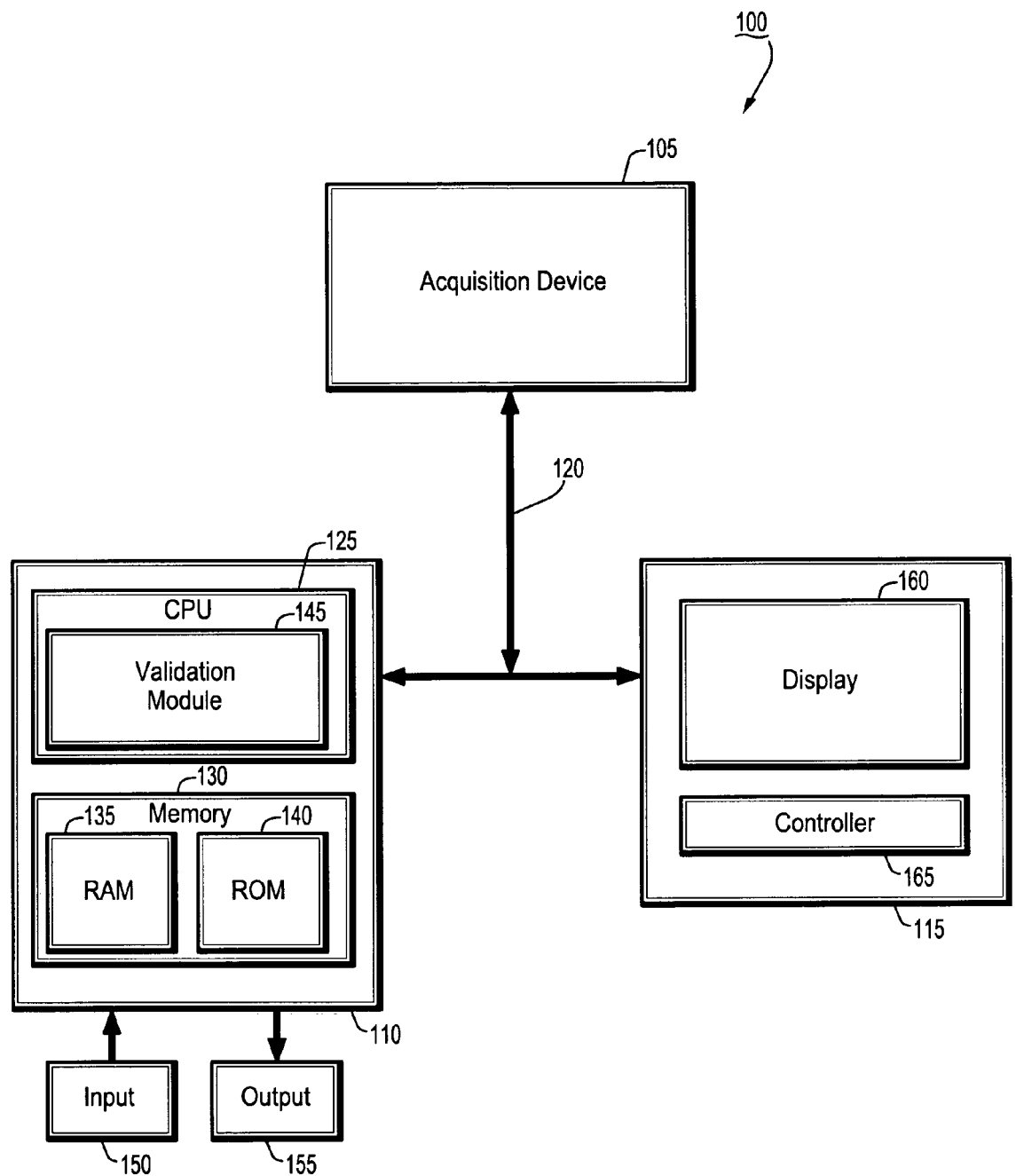
FIG. 1 is a block diagram of a system for validating an image segmentation algorithm according to an exemplary embodiment of the present invention.

FIG. 1 is a block diagram of a system 100 for validating an image segmentation algorithm according to an exemplary embodiment of the present invention.

As shown in FIG. 1, the system 100 includes, inter alia, an acquisition device 105, a PC 110 and an operator's console 115 connected over a wired or wireless network 120.

The acquisition device 105 may be a MRI device, a CT imaging device, a helical CT device, a positron emission tomography (PET) device, a 2D or 3D fluoroscopic imaging device, a 2D, 3D, or 4D ultrasound imaging device, or an x-ray device. The acquisition device 105 may also be a hybrid-imaging device capable of CT, MR, PET or other imaging techniques.

The PC 110, which may be a portable or laptop computer, a medical diagnostic imaging system or a PACS data management station, includes a CPU 125 and a memory 130, connected to an input device 150 and an output device 155. The CPU 125 also includes a validation module 145 that includes one or more methods for validating an image segmentation algorithm to be discussed hereinafter with reference to FIGS. 2-5.

The memory 130 includes a RAM 135 and a ROM 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by an LCD, CRT display, or printer.

The operation of the system 100 may be controlled from the operator's console 115, which includes a controller 165, for example, a keyboard, and a display 160. The operator's console 115 communicates with the PC 110 and the acquisition device 105 so that 2D image data collected by the acquisition device 105 can be rendered into 3D data by the PC 110 and viewed on the display 160. It is to be understood that the PC 110 can be configured to operate and display information provided by the acquisition device 105 absent the operator's console 115 using, for example, the input 150 and output 155 devices to execute certain tasks performed by the controller 165 and display 160.

The operator's console 115 may further include any suitable image rendering system/tool/application that can process digital image data of an acquired image dataset (or portion thereof) to generate and display 2D and/or 3D images on the display 160. More specifically, the image rendering system may be an application that provides 2D/3D rendering and visualization of medical image data, and which executes on a general purpose or specific computer workstation. Moreover, the image rendering system may enable a user to navigate through a 3D image or a plurality of 2D image slices. The PC 110 may also include an image rendering system/tool/application for processing digital image data of an acquired image dataset to generate and display 2D and/or 3D images.

The validation module 145 may also be used by the PC 110 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the PC 110 via the network 120 to an image rendering system in the operator's console 115 for generating 2D and/or 3D renderings of image data in accordance with the data processing results, such as segmentation of organs or anatomical structures, color or intensity variations, and so forth.

Figure 2:
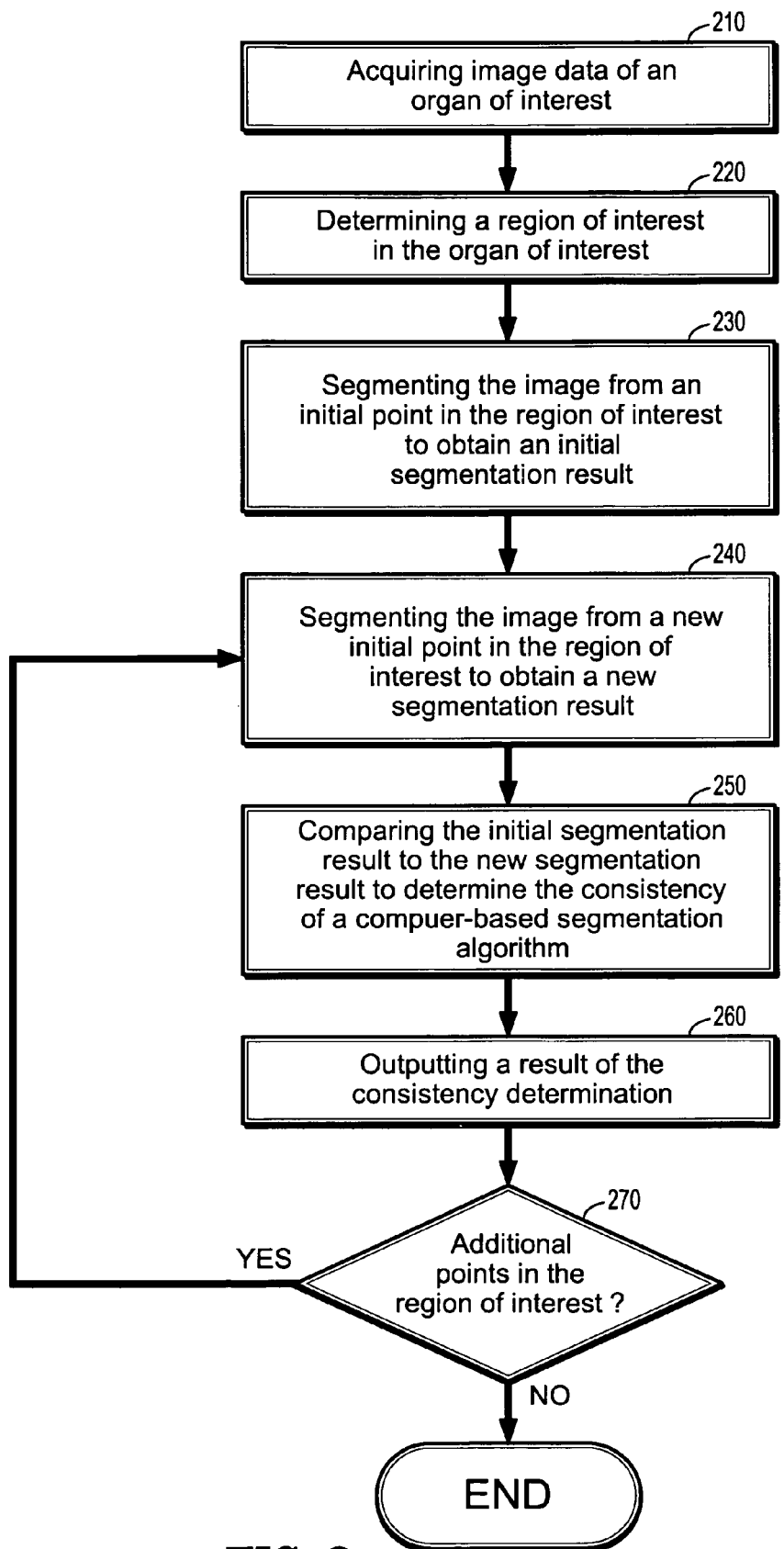
FIG. 2 is a flowchart illustrating a method for validating an image segmentation algorithm according to an exemplary embodiment of the present invention.

FIG. 2 is a flowchart showing an operation of a method for validating an image segmentation algorithm according to an exemplary embodiment of the present invention.

As shown in FIG. 2, image data is acquired from an organ or organs of interest such as a pair of lungs inside a patient (210). This is accomplished by using the acquisition device 105, in this example a CT scanner, which is operated at the operator's console 115, to scan the patient's chest or lungs thereby generating a series of 2D image slices associated with the lungs. The 2D image slices of the lungs are then combined to form a 3D image as shown in image (a) of FIG. 3.

It is to be understood that in addition to the lungs, CT image data can be acquired from any one of a leg, arm, brain, abdomen or other body part containing single/multiple organs or single/multiple tissue types. Further, other types of data acquired from an MRI device, any imaging device associated with the various modalities of the acquisition device 105 or any device such as a flatbed scanner or digital camera may be used in accordance with an exemplary embodiment of the present invention.

Once the image data has been acquired, a region of interest is determined (220). The region of interest may be determined by using a stylus pen or mouse to outline an area in the image containing, for example, a suspected cancerous tumor. An example of a region of interest determined in this manner is shown by outline 320 in image (b) of FIG. 3. Still referring to step 220, the region of interest may also be determined by using a computer-based segmentation algorithm that is capable of identifying regions in an image that contain suspected cancerous tumors or the like.

It is to be understood that the region of interest is an area that may be used to identify an initial point or points in the image within which a single-click initialization should be performed. In other words, the outlined region of interest 320 should be located, for example, around an initial point 310 in images (a) and (b) of FIG. 3, so that a segmentation can be performed therefrom.

After the region of interest has been determined, the image is segmented from an initial point in the region of interest (230). This is accomplished, for example, by segmenting the image from the initial point 310 in the region of interest 320 by using a computer-based segmentation algorithm to obtain a first segmentation result. It is to be understood that the computer-based segmentation algorithm may be an automatic or semi-automatic segmentation algorithm.

For example, the computer-based segmentation algorithm may be the segmentation algorithm disclosed in Li Zhang, Ming Fang, David P. Naidich M.D., Carol L. Novak, "Consistent interactive segmentation of pulmonary ground glass nodules identified in CT studies", Proc. SPIE Vol. 5370, p. 1709-1719, Medical Imaging 2004: Image Processing; J. Michael Fitzpatrick, Milan Sonka; Eds., May 2004, a copy of which is incorporated by reference herein in its entirety.

Once the image has been segmented, the image is again segmented, however, this time the segmentation starts from another initial point (240). In other words, the image is automatically segmented from a second point inside the region of interest by using the same computer-based segmentation algorithm to obtain a second segmentation result.

Now that the image has been segmented from the second initial point, the first and second segmentation results are compared to each other to determine the consistency of the computer-based segmentation algorithm (250). In other words, the accuracy of the computer-based segmentation algorithm is compared with that of the contours (e.g., the region of interest) outlined by the physician in step 220. The consistency/accuracy are measured by an overlap ratio, which may be calculated as shown below in equation [1]:

$$\text{Overlap ratio} = \frac{\text{region1} \cap \text{region2}}{\frac{1}{2}(\text{region1} + \text{region2})} \quad [1]$$

In equation [1], the range of the overlap ratio is from 0 to 1. Thus, for example, an overlap ratio of 0 indicates that there is no overlap between two regions and an overlap ratio of 1 indicates that the two regions are completely overlapped. In other words, an overlap ratio of 0 indicates that there is no overlap between the first and second segmentation results and an overlap ratio of 1 indicates that the first and second segmentation results are completely overlapped.

Once the consistency between the first and second segmentation results has been determined, a result of the consistency determination may then be output to a text report file or to a plot (260). To plot the result, the overlap ratio can be converted into a color representation. For example, different degrees of the color red can be used to represent different values of the overlap ratio. The degree of redness may be calculated as shown below in equation [2]:

$$R = 255 * \text{Overlapratio} \quad [2]$$

Thus, the second initial point may be displayed with the color red having the degree R.

Since the method according to an exemplary embodiment of the present invention is capable of testing all possible initial points in the region of interest, rather than randomly selected individual points, all of the other points in the region of interest may be used individually as an initial point to start a segmentation. Thus, steps 240-260 are repeated for each of the points until each point in the region of interest has been used as an initial point to start a segmentation (270).

For example, if there is an additional initial point, hereinafter referred to as a third initial point, the third initial point is selected and the computer-based segmentation algorithm is performed therefrom to obtain a third segmentation result. The overlap ratio between the first segmentation result and the third segmentation result is calculated using equation [1] and the redness is calculated using equation [2]. The third initial point is then displayed in the plot in the color red having a degree R associated therewith. When all of the points in the region of interest have been displayed with their calculated redness values, the process may end.

It is to be understood that although the exemplary embodiment of the present invention has been described as immediately plotting the result of the consistency determination between two initial points, the plotting can be delayed until the result of the consistency determination between all of the points in the region of interest is complete. In other words, step 260 may take place after step 270 and the result of the consistency determination in step 250 may be stored in the memory 130 for later retrieval.

It is to be further understood that the result of the consistency determination can also be shown in a normalized redness for better viewing. A normalized redness may be calculated as shown below in equation [3]:

$$R^* = 255 * \frac{\text{Overlapratio} - \text{Min}_{overlapratio}}{1 - \text{Min}_{overlapratio}} \quad [3]$$

Where $\text{Min}_{overlapratio}$ is the minimum overlap ratio among the overlap ratios calculated for segmentation results initialized for all of the points in the region of interest.

An example of the result of the consistency determination is shown by a plot 330 in image (c) of FIG. 3. In particular, the plot 330 illustrates the consistency between a first segmentation result taken from the initial point 310 in the region of interest 320 and segmentation results taken from other initial points in the region of interest 320. As can be gleaned, brighter shades of red (or lighter shades of gray in black in white images) (e.g., the shades closer to 1.000) indicate that the first and other segmentation results are almost completely overlapped, whereas darker shades of red (or darker shades of gray in black and white images) (e.g., the shades closer to 0.948) indicate that the first and second segmentation results are slightly less overlapped.

In accordance with an exemplary embodiment of the present invention, consistency between two or more different initial points in a region of interest in an image can be determined to evaluate the segmentation algorithm used to segment the image. For example, the consistency between a first initial point in the region of interest and every other point inside the region of interest may be determined. Thus, the exemplary embodiment is capable of determining the consistency for a large number of points. Accordingly, large regions of interest containing hundreds or thousands of points may be accurately tested.

In addition, the method according to an exemplary embodiment of the present invention may be performed by simply clicking a single button on a PACS workstation. For example, an algorithm tester may sit down in front of a PACS workstation, pull up an image, perform a segmentation from an arbitrary point and select a key on a keyboard or an icon on a display of the workstation to perform a consistency determination for all of the points in a region of interest. Thus, the method streamlines the testing process, improves testing efficiency and reduces user interaction during the testing phase thereby further reducing the amount of error introduced by human interaction.

The method according to an exemplary embodiment of the present invention may also be used to located bugs/exceptions resulting from the method itself. For example, if a plot 420 of a result of the consistency determination produces an image having a black pixel 410 as shown in image (a) of FIG. 4, the black pixel 410 represents a low overlap ratio indicating that the segmentation from this initial point is different from that taken from other points. This tells us that the method or a computer program implementation thereof may have a bug and thus that it failed to segment the image correctly when using the point indicated by the black pixel 410 as an initial point. However, once the bug was fixed in the method or program, the black pixel 410 disappeared as shown by the re-plotted consistency determination map 430 in image (b) of FIG. 4. Thus, illustrating how the method can be adjusted on the fly to adapt to various circumstances.

Figure 5A:
FIG. 5 is an image illustrating a method for validating an image segmentation algorithm integrated with an automatic nodule detection technique according to an exemplary embodiment of the present invention.

In yet another alternative implementation, the result of the consistency determination of the method according to an exemplary embodiment of the present invention may be used to integrate automatic nodule detection and subsequent segmentation techniques. For example, in a plot of the consistency determination as shown in FIG. 5, a user may initialize the segmentation by clicking a middle part 520 of a nodule 510. In FIG. 5, the nodule 510 is represented by pixels colored with bright red (or with lighter shades of gray in black and white images) indicating large overlap ratios and more consistent results. Thus, for an integrated system that includes automatic nodule detection and segmentation methods, if the position of the nodule 510 can be located within its middle part 520 by the detection method, the accuracy of a subsequent segmentation can be guaranteed.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for guiding an initialization of an image segmentation, comprising:
    identifying a region of interest (ROI) in an image, wherein the ROI includes a plurality of points;
    segmenting the image using every point inside the ROI as an initial point to produce a segmentation result for each point in the ROI;
    comparing the segmentation result of each point in the ROI to the segmentation result of every other point in the ROI to produce a consistency measure for each point in the ROI;
    assigning a degree of color to each point in the ROI based on its consistency measure, wherein the degree of color indicates whether or not the point is a good candidate for an initial point of an image segmentation; and
    displaying the image with different degrees of color in the ROI to provide a user with information as to where a segmentation of the image should be initialized.

2. The method of claim 1, wherein the ROI is identified manually or automatically.

3. The method of claim 1, wherein the image is acquired by using one of a CT, MR, positron emission tomography (PET), fluoroscopic, ultrasound, x-ray or hybrid imaging technique, or scanning or digital image recording technique.

4. The method of claim 1, wherein a first initial point of the points in the ROI is selected manually or automatically.

5. The method of claim 4, wherein a second initial point of the points in the ROI is selected manually or automatically.

6. The method of claim 1, wherein the consistency measure for a point in the ROI is determined by using a plurality of overlap ratios, which indicate an amount of overlap between the segmentation result of the point and the segmentation result of every other point in the ROI.

7. The method of claim 6, wherein a degree of color for a point in the ROI is computed from the point's overlap ratios.

8. The method of claim 1, wherein when the image is a two-dimensional image each point in the ROI is a pixel and when the image is a three-dimensional image each point in the ROI is a voxel.

9. A system for guiding an initialization of an image segmentation, comprising:
a memory device for storing a program;
a processor in communication with the memory device, the processor operative with the program to:
indentify a region of interest ROI in an image, wherein the ROI includes a plurality of points;
segment the image using every point inside the ROI as an initial point to produce a segmentation result for each point in the ROI;
compare the segmentation result of each point in the ROI to the segmentation result of every other point in the ROI to produce a consistency measure for each point in the ROI;
assign a degree of color to each point in the ROI based on its consistency measure, wherein the degree of color indicates whether or not the point is a good candidate for an initial point of an image segmentation; and
display the image with different degrees of color in the ROI to provide a user with information as to where a segmentation of the image should he initialized.

10. The system of claim 9, wherein the ROI is identified manually or automatically.

11. The system of claim 9 wherein the image is acquired by using one of a CT, MR, positron emission tomography (PET), fluoroscopic, ultrasound, x-ray or hybrid imaging device, or digital camera or flatbed scanner.

12. The system of claim 9 wherein a first initial point of the points in the ROI is selected manually or automatically.

13. The system of claim 12 wherein the a second initial point of the points in the ROI is selected manually or automatically.

14. The system of claim 9, wherein the consistency measure for a point in the ROI is determined by using a plurality of overlap ratios, which indicate an amount of overlap between the segmentation result of the point and the segmentation result of every other point in the ROI.

15. The system of claim 14 wherein a degree of color for a point in the ROI is computed from the point's overlap ratios.

16. A computer readable medium embodying a program of instructions executable by machine to perform steps for guiding an initialization of an image segmentation the steps comprising:
identifying a region of interest (ROI) in an image, wherein the ROI includes a plurality of points;
segmenting the image using every point inside the ROI as an initial point to produce a segmentation result for each point in the ROI;
comparing the segmentation result of each point in the ROI to the segmentation result of every other point in the ROI to produce a consistency measure for each point in the ROI;
assigning a degree of color to each point in the ROI based on its consistency measure, wherein the degree of color indicates whether or not the point is a good candidate for an initial point of an image segmentation; and
displaying the image with different degrees of color in the ROI to provide a user with information as to where a segmentation of the image should be initialized.

17. The computer readable medium 16 wherein the ROI is identified manually or automatically.

18. The computer readable medium method of claim 16, wherein the image is acquired by using one of a CT, MR, positron emission tomography (PET), fluoroscopic, ultrasound, x-ray or hybrid imaging technique, or scanning or digital image recording technique.

19. The computer readable medium of claim 16, wherein a first initial point of the points in the ROI is selected manually or automatically.

20. The computer readable medium of claim 16, wherein a second initial point of the points in the ROI is selected manually or automatically.

21. The computer readable medium of claim 16 wherein the consistency measure for a point in the ROI is determined by using a plurality of overlap ratios, which indicate an amount of overlap between the segmentation result of the point and the segmentation result of every other point in the ROI.

22. The computer readable medium of claim 21, wherein a degree of color for a point in the ROI is computed from the point's overlap ratios.

* * * * *